US010509562B2

(12) United States Patent
Kachi et al.

(10) Patent No.: US 10,509,562 B2
(45) Date of Patent: Dec. 17, 2019

(54) WEARABLE ELECTRONIC DEVICE HAVING A TOUCH SCREEN

(71) Applicant: CASIO COMPUTER CO., LTD., Shibuya-ku, Tokyo (JP)

(72) Inventors: Koji Kachi, Tokyo (JP); Shigeru Hanagata, Tokyo (JP); Keiichi Imamura, Tokyo (JP); Takeshi Okada, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/756,223

(22) PCT Filed: Aug. 2, 2016

(86) PCT No.: PCT/JP2016/003558
§ 371 (c)(1),
(2) Date: Feb. 28, 2018

(87) PCT Pub. No.: WO2017/046992
PCT Pub. Date: Mar. 23, 2017

(65) Prior Publication Data
US 2018/0246642 A1     Aug. 30, 2018

(30) Foreign Application Priority Data

Sep. 15, 2015 (JP) .................. 2015-182065

(51) Int. Cl.
*G06F 3/041* (2006.01)
*G04G 21/08* (2010.01)
(Continued)

(52) U.S. Cl.
CPC ......... *G06F 3/04886* (2013.01); *G04G 21/08* (2013.01); *G06F 3/04883* (2013.01); *G06F 3/044* (2013.01); *G06F 3/045* (2013.01)

(58) Field of Classification Search
CPC ... G06F 3/041; G06F 3/00; G06F 1/16; G06F 3/044; G04C 13/00; G04G 21/08
See application file for complete search history.

(56) References Cited

U.S. PATENT DOCUMENTS 7,031,228 B2    4/2006  Born et al.
7,932,893 B1 *  4/2011  Berthaud ............... G04G 21/00
                                              178/18.06
(Continued)

FOREIGN PATENT DOCUMENTS

CN    100370405 C     2/2008
JP    2004093568 A    3/2004
JP    2012531607 A   12/2012

OTHER PUBLICATIONS

International Search Report (ISR) and Written Opinion dated Nov. 1, 2016 issued in International Application No. PCT/JP2016/003558.

(Continued)

*Primary Examiner* — Pegeman Karimi
(74) *Attorney, Agent, or Firm* — Holtz, Holtz & Volek PC

(57) ABSTRACT

An electronic device includes a touch sensor that, by operating in a predetermined operation direction, inputs a predetermined instruction to the electronic device, and a frame-like member that is provided so as to surround the touch sensor. A predetermined first processing is carried out on a first region of the frame-like member corresponding to the predetermined operation direction, and second processing, which is different from the first processing, is carried out on a second region, which is a region of the frame-like member other than the first region.

18 Claims, 4 Drawing Sheets

(51) Int. Cl.
*G06F 3/0488* (2013.01)
*G06F 3/044* (2006.01)
*G06F 3/045* (2006.01)

(56) References Cited

U.S. PATENT DOCUMENTS

| | | | | |
|---|---|---|---|---|
| 2002/0027547 A1* | 3/2002 | Kamijo | ............... | G04G 21/00 345/157 |
| 2004/0042347 A1 | 3/2004 | Born et al. | | |
| 2006/0092177 A1* | 5/2006 | Blasko | ............... | G04G 21/08 345/619 |
| 2011/0157046 A1* | 6/2011 | Lee | ............... | G04G 21/08 345/173 |
| 2012/0092383 A1 | 4/2012 | Hysek et al. | | |
| 2017/0160865 A1* | 6/2017 | Fukutome | ............ | G06F 3/0416 |

OTHER PUBLICATIONS

Extended European Search Report (EESR) dated Sep. 25, 2018 issued in European Patent Application No. 16845871.9.
Japanese Office Action dated Mar. 5, 2019 (and English translation thereof) issued in Japanese Application No. 2015-182065.
Chinese Office Action dated Jul. 3, 2019 (and English translation thereof) issued in counterpart Chinese Application No. 201680052753.4.

* cited by examiner

WEARABLE ELECTRONIC DEVICE HAVING A TOUCH SCREEN

TECHNICAL FIELD

The present invention relates to an electronic device including a touch sensor.

BACKGROUND ART

Conventionally, a wearable electronic device such as a wrist terminal worn on an arm has been known which includes a touch screen function by superimposing a touch sensor on a display screen.

Technology relating to a wearable electronic device having a touch screen is disclosed in Japanese Unexamined Patent Application (Translation of PCT Application), Publication. No. 2012-531607.

CITATION LIST

Patent Literature

[PTL 1] Japanese Unexamined Patent Application (Translation of PCT Application), Publication No. 2012-531607

SUMMARY OF INVENTION

Problems to be Solved by the Invention

However, regarding such an electronic device having a touch screen, if a user wants to operate a touch screen while doing sports such as running while having such an electronic device, on an arm, for example, it is necessary for the user to visually recognize the screen each time in order to operate the touch screen. In other words, there is room to improve the operability of the conventional electronic device including a touch screen.

The present invention has been made in view of such a situation, and it is an object of the present invention to guide operations on a touch screen without visually recognizing the screen.

Means for Solving the Problems

In order to achieve the abovementioned object, an aspect of an electronic device of the present invention is
an electronic device comprising:
  a touch sensor that, by operating in a predetermined operation direction, inputs a predetermined instruction to the electronic device; and
  a frame-like member that is provided so as to surround the touch sensor,
  wherein predetermined first processing is carried out on a first region of the frame-like member corresponding to the predetermined operation direction, and second processing, which is different from the first processing, is carried out on a second region, which is a region of the frame-like member other than the first region.

Effects of the Invention

According to the present invention, it becomes possible to guide operations on a touch screen without visually recognizing a screen.

PREFERRED MODE FOR CARRYING OUT THE INVENTION

In the following, embodiments of the present invention will be described with reference to the drawings.
Configuration FIG. 1 is a schematic view illustrating a configuration of an outer appearance of a wrist terminal 1 as an embodiment of an electronic device of the present invention.

Figure 1:
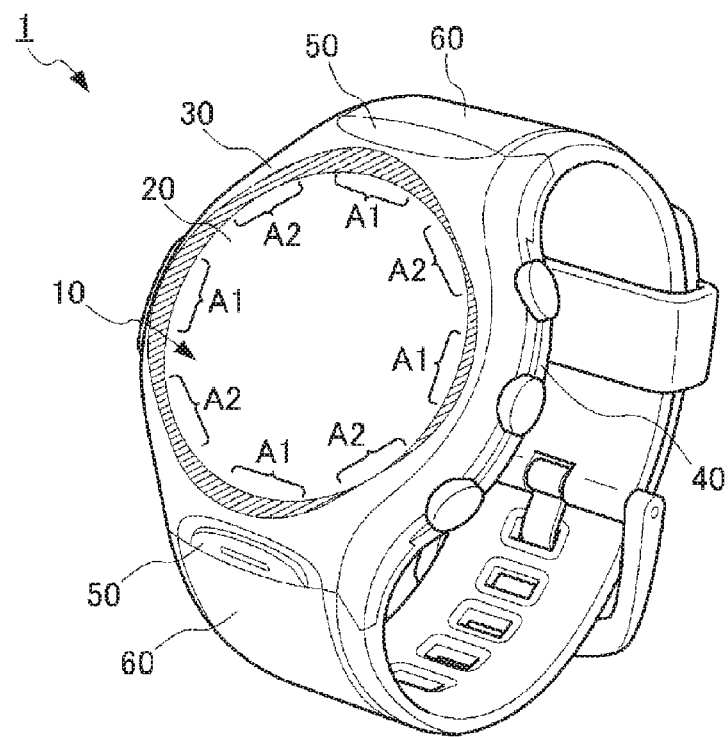
FIG. 1 is a schematic view illustrating a configuration of an outer appearance of a wrist terminal as an embodiment of an electronic device of the present invention.

It should be noted that FIG. 1 illustrates a perspective view of a wrist terminal 1.

As illustrated in FIG. 1, the wrist terminal 1 includes a display 10, a touch screen 20, a frame-like member 30, a case 40, a belt retaining member 50, and a belt 60.

The display 10 displays various kinds of information such as time, map, or a setting screen, according to the control of a CPU (Central Processing Unit) (not illustrated). The display 10 can be configured by various kinds of display devices such as a liquid crystal display device and an LED (Light Emitting Diode) display device.

The touch sensor 20 is configured with a touch sensor of capacitive-type, resistance-film-type, or the like, and detects a contact position of a contacting object such as a user's finger. In the present embodiment, the touch sensor 20 is arranged so as to be superimposed on the display 10, and a display position on the display 10 is associated with a contact position on the touch sensor. In other words, the touch screen is configured by the display 10 and the touch sensor 20.

The frame-like member 30 constitutes a frame body that surrounds the display 10 and the touch sensor 20, and retains the display 10 and the touch sensor 20. In addition, the frame-like member 30 projects toward a front face side (outside of the direction of a normal line) more than an operation face of the touch sensor 20, and protects the operation face of the touch sensor 20 and a display face of the display 10. In addition, in order to improve the operability with respect to the touch sensor 20, as described later, the frame-like member 30 is configured so that the inclination angle of an inner circumferential face differs in each region in a circumferential direction. It should be noted that the frame-like member 30 can be configured as a component such as a bezel or a protection, etc.

The case 40 retains the display 10, the touch sensor and the frame-like member 30, and stores electronic components of the wrist terminal 1 such as the CPU (not illustrated) therein.

The belt retaining member 50 is provided at the upper and lower edge of the outer circumference of the case 40 (positions in the directions of 0 o'clock and 6 o'clock as seen from the top), and retains the belt 60 for wearing the wrist terminal 1 to an arm of a user.

The belt 60 is retained at the edge by the belt retaining member 50, and includes a buckle which allows the adjustment of its length in a multi-stage manner. Then, the length of the belt 66 is adjusted by the buckle, and the belt 60 is wound around the arm of the user. With such a configuration, the wrist terminal 1 is worn on the arm of the user.

Specific Configuration of Frame-Like Member 30

Next, a specific configuration of the frame-like member 30 of the wrist terminal 1 will be described.

Figure 2:
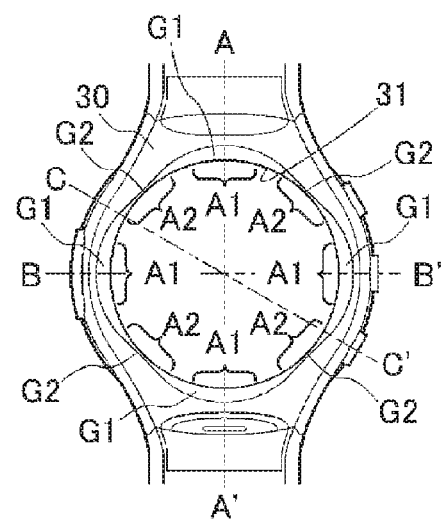
FIG. 2 is a top view of an operation face of the wrist terminal.

FIG. 2 is a top view of an operation face of the wrist terminal 1.

Figure 3A:
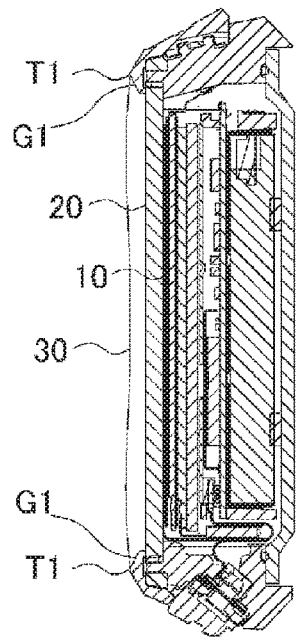
FIG. 3A is a schematic view illustrating a cross section of the wrist terminal, and illustrates a cross-sectional view alone the line A-A' in FIG. 2.
Figure 3B:
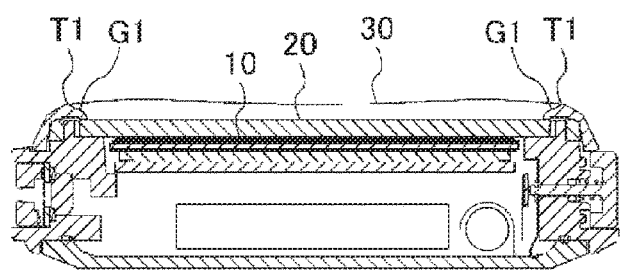
FIG. 3B is a schematic view illustrating a cross section of the wrist terminal, and illustrates a cross-sectional view along the line B-B' in FIG. 2.
Figure 3C:
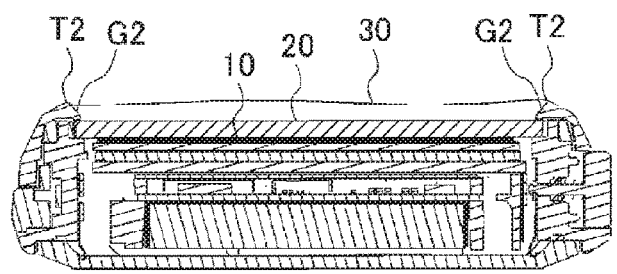
FIG. 3c is a schematic view illustrating a cross section of the wrist terminal, and illustrates a cross-sectional view along the line C-C' in FIG. 2.

In addition, FIG. 3A is a schematic view illustrating a cross section of the wrist terminal 1, and illustrates a cross-sectional view along the line A-A' in FIG. 2. FIG. 3B is a schematic view illustrating a cross section of the wrist terminal 1, and illustrates a cross-sectional view along the line B-B' in FIG. 2. FIG. 3C is a schematic view illustrating a cross section of the wrist terminal 1, and illustrates a cross-sectional view along the line C-C' in FIG. 2. It should be noted that, although electronic components such as the CPU (not illustrated) are accommodated in the wrist terminal 1 in FIGS. 3A to 3C, the interior structure of the wrist terminal 1 is omitted as appropriate or illustrated schematically for the purpose of illustration.

As illustrated in FIG. 2, the frame-like member 30 of the wrist terminal 1 includes an opening portion 31 which surrounds the touch sensor 20 in a circle. The inner circumferential face of the opening portion 31 includes an inclination portion that rises from a position contacting the surface (operation face) of the touch sensor 20 in the height direction (the direction projecting from the operation face), and the inclination angle of the inclination portion differs in each region in the circumferential direction.

More specifically, the opening portion 31 of the frame-like member 30 includes an inclination portion G1 of which the inclination angle of the inner circumferential face is small at regions A1 positioned in the direction connecting 0 o'clock and 6 o'clock and in the direction connecting 3 o'clock and 9 o'clock, and the inclination portion G1 is formed (processed) in a form which gently rises from the surface of the touch sensor 20. On the other hand, the opening portion 31 of the frame-like member 30 includes an inclination portion G2 of which the inclination angle of the inner circumferential face is large at regions A2 positioned in the direction connecting the approximate center between 0 o'clock and 3 o'clock with the approximate center between 6 o'clock and 9 o'clock and in the direction connecting the approximate center of 3 o'clock and 6 o'clock and the approximate center of 9 o'clock and 0 o'clock, and the inclination portion G2 is formed (processed) in a form which steeply rises from the surface of the touch sensor 20. It should be noted that the height of the frame-like member 30 from the surface of the touch sensor 20 is the same in the regions A1 and the regions A2 in the present embodiment. In addition, the form of the opening portion 31 continuously changes in the regions A1 to the regions A2 in the present embodiment.

In other words, as illustrated in FIGS. 3A and 3B, at the opening portion 31 of the frame-like member 30, in the cross section A-A' and the cross section B-B' through the region A1, the inclination G1 from the surface of the touch sensor 20 to the top portion T1 of the frame-like member 30 rises with the gentle angle θ1.

On the other hand, as illustrated in FIG. 3C, at the opening portion 31 of the frame-like member 30, in the cross section C-C' through the region A2, the inclination portion G2 from the surface of the touch sensor 20 to the top portion T2 of the frame-like member 30 rises with the steep angle θ2 (θ2>θ1).

Therefore, in a case in which a user operates the touch sensor 20, when moving a finger in the direction of the A-A' line and the direction of the B-B' line, it is difficult for the finger to contact with the frame-like member 30, and when moving the finger in the direction of the C-C' line other than the direction of the A-A' line and the direction of the B-B' line, it is easy for the finger to contact with the frame-like member 30.

In other words, it is formed so as to be a form in which the frame-like member at the position, at which the frame-like member and a linear line progressing in a predetermined operation direction operated by a user through the center of the touch sensor 20 intersect, rises gently from the surface of the touch sensor 20.

In addition, since the heights of the top portion T1 of the region A1 and the top portion 12 of the region A2 from the surface of the touch sensor 20 are the same, due to such a frame-like member 30, it is difficult for a foreign material which is not intended to perform a touch operation on the surface of the touch sensor 20 to contact with the surface of the touch sensor 20.

Effects

Next, the effects of the wrist terminal 1 will be described.

Figure 4:
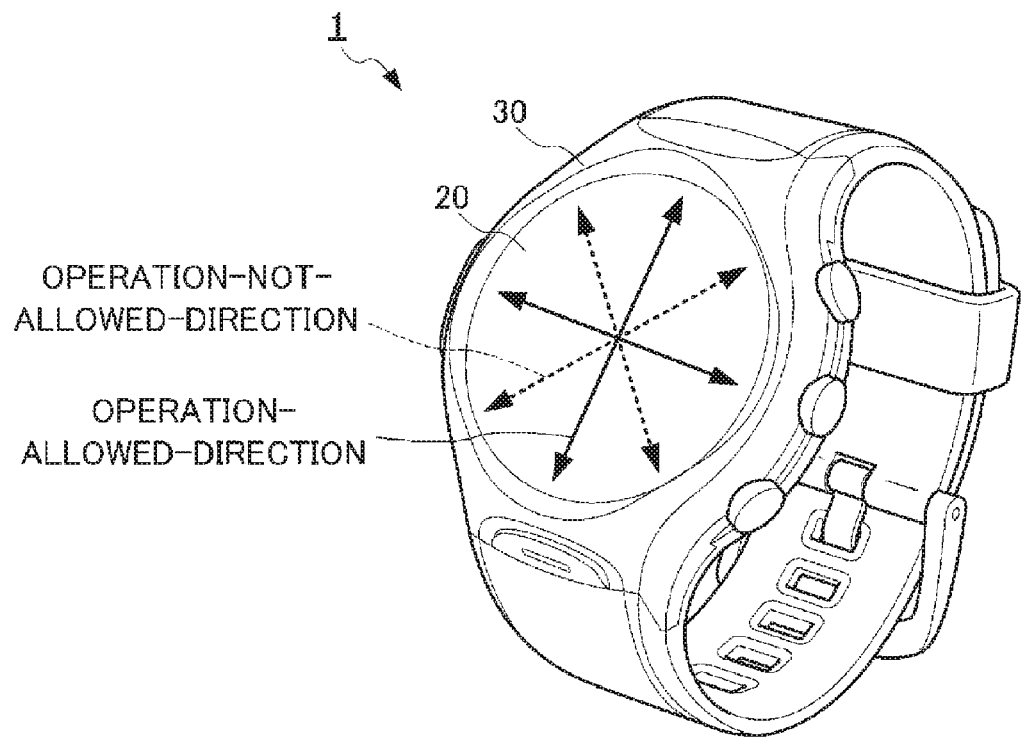
FIG. 4 is a view which schematically illustrates an operation direction when operating a couch sensor of the wrist terminal.

FIG. 4 is a view which schematically illustrates an operation direction when operating the touch sensor 20 of the wrist terminal 1.

In the wrist terminal 1, an operation direction when operating the touch sensor 20, i.e. an operation direction when performing so-called a flick operation or a swipe operation on the touch sensor 20 is set beforehand, and it is a setting for performing an operation in the direction connecting 0 o'clock and 6 o'clock and in the direction connecting 3 o'clock and 9 o'clock in the present embodiment.

In other words, the wrist terminal 1 performs display on the display 10 and, when receiving an operation on the display, it is set so that an operation along either one of the direction connecting 0 o'clock and 6 o'clock and the direction connecting 3 o'clock and 9 o'clock (operation along the solid arrow lines in FIG. 4) is allowed, and operations in the other directions (for example, operation along the dashed arrow lines in FIG. 4) are not allowed. It should be noted that the direction in which an operation on the touch sensor 20 is allowed is referred to as "operation-allowed-direction" and the direction in which an operation on the touch sensor 20 is not allowed is referred to as "operation-not-allowed-direction".

Under such a setting, it is possible for a user to easily understand in which direction an operation is allowed, by visually recognizing the form of the frame-like member 30, i.e. the inclination angle of the inclination portion at the opening portion 31, when the user performs an operation on the touch sensor 20.

Figure 5A:
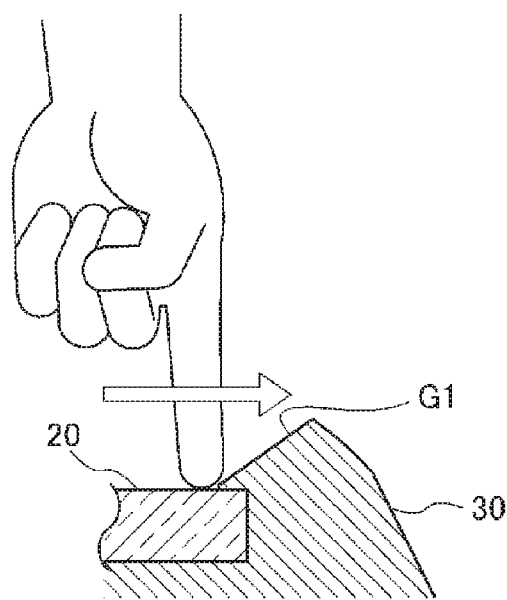
FIG. 5A is a schematic view illustrating a difference in operability depending on the operation direction when operating a touch sensor, and a schematic view illustrating a case of performing an operation in an operation-allowed-direction.
Figure 5B:
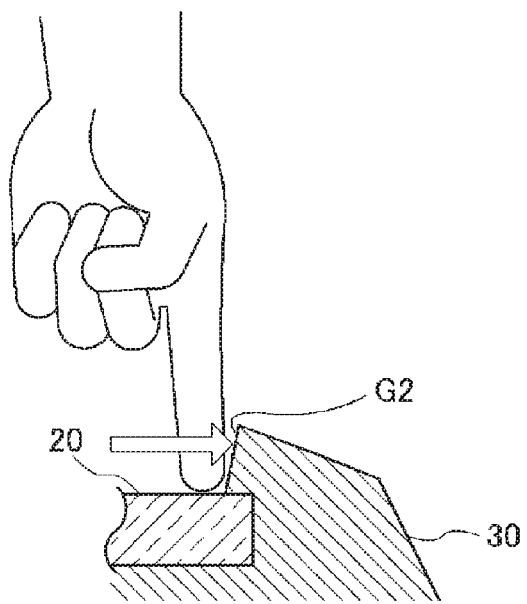
FIG. 5B is a schematic view illustrating a difference in operability depending on the operation direction when operating a touch sensor, and a schematic view illustrating a case of performing an operation in an operation-not-allowed-direction.

FIG. 5A is a schematic view illustrating a difference in operability depending on the operation direction when operating the touch sensor 20, and a schematic view illustrating a case of performing an operation in the operation-allowed-direction. FIG. 5B is a schematic view illustrating a difference in operability depending on the operation direction when operating the touch sensor 20, and a schematic view illustrating a case of performing an operation in the operation-not-allowed-direction. It should be noted that the wrist terminal 1 and a hand of a user are illustrated in a ratio different from the actual sizes thereof in FIGS. 5A and 5B for the purpose of illustration.

In a case of the user performing an operation on the touch sensor 20, when operating in the operation-allowed-direction, as illustrated in FIG. 5A, since a finger of the user moves in the direction connecting the regions A1, the operation by the user's finger are not hindered by contacting with the inner circumferential face (the inclination portion G1) of the frame-like member 30. On the other hand, when operating in the operation-not-allowed-direction, as illustrated in FIG. 5B, since a finger of the user moves in the direction connecting the regions A2, the operation by the user's finger is hindered by contacting with the inner circumferential face (the inclination portion G2) of the frame-like member 30.

For this reason, it is possible for the user to intuitively recognize whether the user's operation was an operation in an appropriate direction based on the feel of the fingertip.

With such a configuration, it is possible for the user to more appropriately perform an operation on the wrist terminal 1, even when it is not possible to visually recognize the wrist terminal 1 (for example, while running).

In addition, in the present embodiment, the height of the frame-like member 30 from the surface of the touch sensor 20 is the same at the portions in the operation-allowed direction and the operation-not-allowed-direction.

Therefore, with the wrist terminal 1, it is possible to realize the function of protecting the surface of the touch sensor 20 from a foreign material which is not intended to perform a touch operation being in contact with the surface of the touch sensor 20, while improving the operability.

Modified Embodiment 1

In the abovementioned embodiment, the descriptions are provided in which the inclination portion is formed at the inner circumferential face of the opening portion 31 of the frame-like member 30. On the other hand, it may be configured so that surface processing to form uneven shapes is carried out on the inner circumferential face of the opening portion 31 of the frame-like member 30.

More specifically, it may be configured so that processing is performed to roughen a surface by, for example, continuously forming microscopic dots or a specific pattern in a portion of the region A1 at the inner circumferential face of the opening portion 31 of the frame-like member 30, a result of which it is possible to make the portion of the region A1 a form which imparts a rougher feeling than portions other than the region A1.

With such a configuration, it is possible for the user to intuitively recognize whether the user's operation was an operation in an appropriate direction based on the feel of the fingertip.

In addition, other than continuously forming the microscopic dots or the specific pattern, it may be configured so as to indicate an operation-allowed direction by the sense of sight, while indicating whether the user's operation was an operation in an appropriate direction based on the feel, by forming uneven shapes of arrows or triangles, for example.

Figure 6:
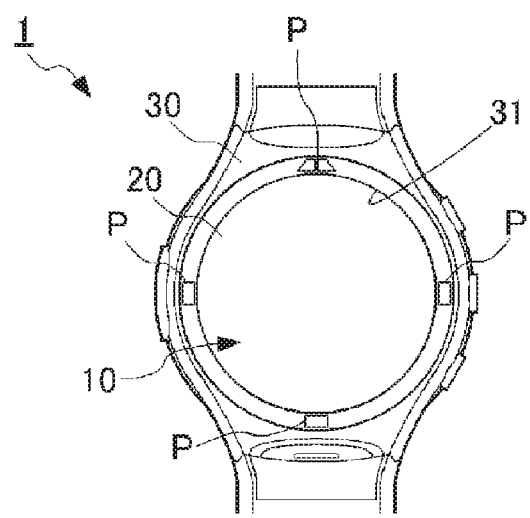
FIG. 6 is a schematic view illustrating a configuration example in which a protruding portion having a convex shape is formed on the inner circumferential face of the opening portion of the frame-like member.

FIG. 6 is a schematic view illustrating a configuration example in which a protruding portion P having a convex shape is formed on the inner circumferential face of the opening portion 31 of the frame-like member 30.

For example, as illustrated in FIG. 6, it may be configured so as to indicate an operation-allowed direction by the sense of sight, while indicating whether the user's operation was an operation in an appropriate direction based on the feel, by forming/arranging the protruding portion P having the convex shape in a portion of the region A1 positioned in 0 o'clock, 6 o'clock, 3 o'clock, and 9 o'clock at the inner circumferential face of the opening portion 31 of the frame-like member 30. It should be noted that, as illustrated in FIG. 6, the protruding portion in the portion of the region A1 positioned in 0 o'clock may be distinguishable design from the protruding portions at the other positions. With such a design, the user can wear the wrist terminal 1 on the arm after confirming the directions of 0 o'clock in the wrist terminal 1. Therefore, it is possible to prevent a mistake of wearing direction of the wrist terminal 1 on the arm.

The wrist terminal 1 configured as above includes the touch sensor 20 and the frame-like member 30.

The touch sensor 20 inputs a predetermined instruction to the wrist terminal 1 by operating in a predetermined operation direction.

The frame-like member 30 is provided so as to surround the touch sensor 20.

Predetermined first processing is carried out on the region A1 of the frame-like member 30 corresponding to a predetermined operation direction, and predetermined second processing different from the first processing is carried out on the region A2, which is a region other than the region A1 of the frame-like member 30.

With such a configuration, it is possible for the user to intuitively recognize the direction of an operation they performed, based on the feel of the fingertip.

Therefore, it becomes possible to guide operations on the touch panel without visually recognizing the screen.

Furthermore, the inclination portion G1 is provided which is inclined by the angle θ1 with respect to the operation face of the touch sensor 20 at the region A1, and the inclination portion G2 is provided, which is inclined by the angle θ2 that is different from the angle θ1 with respect to the operation face of the touch sensor 20, at the region A2.

With such a configuration, it is possible for the user to intuitively recognize the direction of an operation they performed, based on the feel of the inclination angle of the frame-like member 30.

Furthermore, the inclination angle of the inclination portion G1 with the angle θ1 with respect to the operation face of the touch sensor 20 is smaller than the angle of the inclination portion G2 with the angle θ2.

With such a configuration, since the user's finger easily contacts with the portion of the inclination portion G2, and the user's finger will not easily contact with the portion of the inclination portion G1, it is possible to guide the user to operate the portion of the inclination portion G1.

Furthermore, the region A1 and the region A2 project toward the outside more than the operation face of the touch sensor 20.

With such a configuration, it is possible to realize a function of protecting the surface of the touch sensor 20 from contact by a foreign material which is not intended to perform a touch operation.

Furthermore, the top portion 11, which projects toward the outside more than the operation face of the touch sensor 20, is provided in the region A1, and the top portion 12 of which the height is different from that of the top portion T1 is provided in the region A2.

With such a configuration, it is possible to guide the user's operation based on the heights of the top portion T1 and the top portion T2 in a visual manner as well as based on the feel of the finger.

Furthermore, the top portion T2 projects toward the outside of the operation face of the touch sensor 20 more than the top portion T1.

With such a configuration, it is possible to intuitively recognize that the position of the region A1 having the top portion T1 is the operation-allowed-direction.

Furthermore, a predetermined operation direction consists of the first operation direction and the second operation direction that is orthogonal to the first operation direction, and the regions A1 are provided at regions corresponding to the first and second operation directions.

With such a configuration, it is possible to guide the user's operation in the operation directions of the first operation direction and the second operation direction.

Furthermore, the wrist terminal 1 includes the belt 60.

The belt 60 is coupled with one end and the other end of the wrist terminal 1.

The first operation direction refers to a direction connecting the one end and the other end with which the belt 60 is coupled.

With such a configuration, it is possible to guide the user's operation in the direction connecting the coupling portions of the belt 60.

Furthermore, the display 10 is arranged inside the wrist terminal 1 with respect to the operation face of the touch sensor 20.

With such a configuration, it is possible to guide the user's operation on the display of the display 10.

Furthermore, a positional relationship between the display for operation input on the display 10, and the region A1 and the region A2 of the frame-like member 30 are associated with each other.

With such a configuration, it becomes possible to guide the direction of an operation which is allowed on the display for operation input displayed on the display 10, according to the form of the frame-like member 30.

It should be noted that the present invention is not to be limited to the aforementioned embodiments, and that modifications, improvements, etc. within a scope that can achieve the objects of the present invention are also included in the present invention.

In other words, when implementing the present invention, so long as the predetermined first processing is carried out in the region A1 of the frame-like member 30 corresponding to a predetermined operation direction, and the second processing, which is different from the first processing, is carried out in the region A2, which is a region other than the region A1 of the frame-like member 30, various kinds of forms can be established, and thus, it becomes possible to guide the user's operation with such a configuration.

For example, although descriptions are provided in which the height of the frame-like member 30 from the surface of the touch sensor 20 is the same at the top portion 11 of the region A1 and the top portion T2 of the region A2 in the abovementioned embodiment, the present invention is not limited thereto. In other words, the height of the frame-like member 30 from the surface of the touch sensor 20 may be configured so that the height up to the top portion 12 of the region A2 is formed (processed) to be higher than the height up to the top portion T1 of the region A1. With such a configuration, it is possible to guide the user's operation based on the heights of the top portion T1 and the top portion 12 in a visual manner, as well as based on the feel of the finger. Furthermore, due to the height of the top portion T1 being lower than the height of the top portion T2, it is possible for the user to intuitively recognize that the position of the region A1 having the top portion T1 is the operation-allowed-direction.

Furthermore, although descriptions are provided in which the inclination angle of the inclination portion G1 rises in the direction projecting from the surface (operation face) of the touch sensor 20 in the abovementioned embodiment, the present invention is not limited thereto. It may be established to configure the frame-like member 30 in a form in which the inclination portion G1 goes down in a back-face direction from the surface of the touch sensor 20 from the position contacting with the surface of the touch sensor 20.

Even when such a configuration, it is still possible to guide the user's operation in a visual manner and based on the feel of the finger.

Furthermore, although the electronic device to which the present invention is applied is described with the wrist terminal 1 as an example in the abovementioned embodiment, the present invention is not limited thereto.

For example, the present invention can be applied to general electronic devices having a touch screen function worn on a body. Specifically, the present invention can be applied to, for example, a measurement apparatus such as a pedometer and a physical activity meter, a biological information sensor such as a blood pressure manometer and a pulse rate meter.

Although some embodiments of the present invention have been described above, the embodiments are merely exemplifications, and are not to limit the technical scope of the present invention. Various other embodiments can be assumed for the present invention, and various modifications such as omissions and replacements are possible without departing from the spirit of the present invention. Such embodiments and modifications are included in the scope of the invention and the summary described in the present disclosure, and are included in the invention recited in the claims as well as the equivalent scope thereof.

EXPLANATION OF REFERENCE NUMERALS 1 wrist terminal
10 display
20 touch sensor
30 frame-like member
31 opening portion
40 case
50 belt retaining member
60 belt
A1, A2 region
G1, G2 inclination portion
T1, T2 top portion
P protruding portion

The invention claimed is:

1. An electronic device comprising:
   a touch sensor that, by operating in a predetermined operation direction, inputs a predetermined instruction to the electronic device; and
   a frame-like member including an opening portion that surrounds the touch sensor,
   wherein predetermined first processing is carried out on a first region of the opening portion of the frame-like member corresponding to the predetermined operation direction, and second processing, which is different from the first processing, is carried out on a second region, which is a region of the opening portion of the frame-like member other than the first region, and
   wherein a first inclination portion, which is inclined by a first angle with respect to an operation face of the touch sensor, is provided in the first region, and a second inclination portion, which is inclined by a second angle that is different from the first angle with respect to the operation face of the touch sensor, is provided in the second region.

2. The electronic device according to claim 1, wherein the first angle is smaller than the second angle.

3. The electronic device according to claim 2, wherein the first region and the second region project outside of the operation face of the touch sensor.

4. The electronic device according to claim 2,
   wherein the predetermined operation direction comprises a first operation direction and a second operation direction orthogonal to the first operation direction, and
   wherein the first region is provided at a region corresponding to the first operation direction and the second operation direction.

5. The electronic device according to claim 2, wherein a display device is disposed at an inner side of the electronic device with respect to the operation face of the touch sensor.

6. The electronic device according to claim 1, wherein the first region and the second region project outside of the operation face of the touch sensor.

7. The electronic device according to claim 6, wherein a first projecting portion, which projects outside of the operation face of the touch sensor, is provided in the first region, and a second projecting portion of a different height than the first projecting portion is provided in the second region.

8. The electronic device according to claim 6,
   wherein the predetermined operation direction comprises a first operation direction and a second operation direction orthogonal to the first operation direction, and
   wherein the first region is provided at a region corresponding to the first operation direction and the second operation direction.

9. The electronic device according to claim 6, wherein a display device is disposed at an inner side of the electronic device with respect to the operation face of the touch sensor.

10. The electronic device according to claim 7, wherein the second projecting portion projects outside of the operation face of the touch sensor more than the first projecting portion.

11. The electronic device according to claim 7,
    wherein the predetermined operation direction comprises a first operation direction and a second operation direction orthogonal to the first operation direction, and
    wherein the first region is provided at a region corresponding to the first operation direction and the second operation direction.

12. The electronic device according to claim 10,
    wherein the predetermined operation direction comprises a first operation direction and a second operation direction orthogonal to the first operation direction, and
    wherein the first region is provided at a region corresponding to the first operation direction and the second operation direction.

13. The electronic device according to claim 1,
    wherein the predetermined operation direction comprises a first operation direction and a second operation direction orthogonal to the first operation direction, and
    wherein the first region is provided at a region corresponding to the first operation direction and the second operation direction.

14. The electronic device according to claim 13,
    further comprising a belt portion that is coupled with a first end and a second end of the electronic device,
    wherein the first operation direction is a direction connecting the first end with the second end to which the belt portion is coupled.

15. The electronic device according to claim 1, wherein a display device is disposed at an inner side of the electronic device with respect to the operation face of the touch sensor.

16. The electronic device according to claim 15, wherein a position of a display for operation input on the display device is associated with positions of the first region and the second region of the frame-like member.

17. The electronic device according to claim 1, wherein a display device is disposed at an inner side of the electronic device with respect to the operation face of the touch sensor.

18. The electronic device according to claim 1, wherein:
    the predetermined operation direction includes an operation-allowed direction in which an operation on the electronic device is allowed, and an operation-not-allowed direction other than the operation-allowed direction,
    the first region corresponds to the operation-allowed direction, and
    the second region corresponds to the operation-not-allowed direction.

* * * * *